United States Patent [19]

Stoddard et al.

[11] 4,177,249
[45] Dec. 4, 1979

[54] WET OXIDATION OF SULPHUR AND THE CAPTURE OF GENERATED HEAT

[76] Inventors: Xerxes T. Stoddard, 4617 W. 27th Ave., Denver, Colo. 80212; Vesper A. Vaseen, 9840 W. 35th Ave., Wheatridge, Colo. 80033; Ruel C. Terry, 3090 S. High St., Denver, Colo. 80210

[21] Appl. No.: 832,635

[22] Filed: Sep. 12, 1977

[51] Int. Cl.$^2$ .............................................. C01B 17/72
[52] U.S. Cl. ............................... 423/522; 423/DIG. 9
[58] Field of Search ............... 423/242, 522, 531–543, 423/512 A, 521, 659, DIG. 9; 55/73

[56] References Cited

U.S. PATENT DOCUMENTS

| 2,686,114 | 8/1954 | McGauley et al. | 423/35 |
| 2,721,795 | 10/1955 | McGauley et al. | 423/215.5 |
| 2,932,613 | 4/1960 | Huesler et al. | 423/DIG. 3 |
| 3,696,929 | 10/1972 | Shah | 423/DIG. 3 |
| 3,849,541 | 11/1974 | Bertrand | 55/73 |
| 3,938,738 | 2/1976 | Nagel et al. | 261/DIG. 75 |
| 3,963,611 | 6/1976 | Dardenne-Ankringa, Jr. | 423/544 |
| 4,049,398 | 9/1977 | Vaseen | 55/36 |

FOREIGN PATENT DOCUMENTS

| 600803 | 6/1960 | Canada | 423/221 |
| 958322 | 11/1974 | Canada | 261/DIG. 75 |

Primary Examiner—O. R. Vertiz
Assistant Examiner—Gary P. Straub
Attorney, Agent, or Firm—Ruel C. Terry

[57] ABSTRACT

A method for the manufacture of sulphuric acid wherein sulphur, in one case, and a source of sulphur in another case is reacted at superatmospheric temperatures and pressures with oxygen dissolved in an inert liquid in the presence of water, the inert liquid being selected from fluorocarbon compounds having eight or more carbon atoms. Heat is captured from the inert liquid.

6 Claims, 1 Drawing Figure

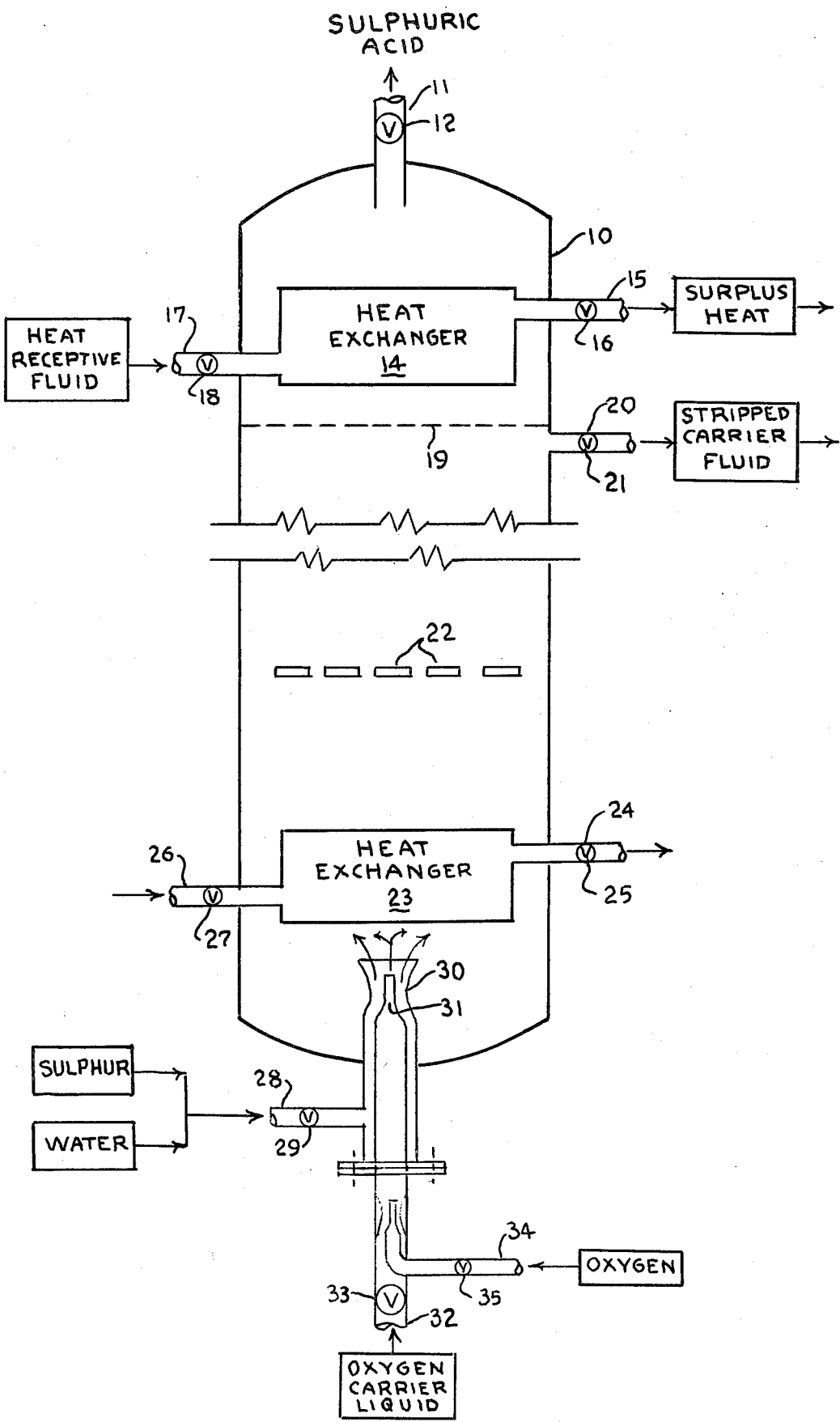

WET OXIDATION OF SULPHUR AND THE CAPTURE OF GENERATED HEAT

REFERENCES

U.S. Pat. Nos.
2,746,859—of McGauley, et al
2,686,114—of McGauley, et al
2,721,795—of McGauley, et al
3,963,611—of Dardenne - Ankringa, Jr.

BACKGROUND OF THE INVENTION

It is well known in the art how to make sulphuric acid. From the alchemists laboratories in the seventeenth century, manufacturing processes expanded into what is now commonly called the chamber process. Although the chamber process is still in commercial use, in more recent times the contact process has gained favor. In both processes the basic raw material is sulphur dioxide in gaseous form. For the chamber process sulphur dioxide is introduced into large lead-lined chambers where it reacts with oxygen, water vapor and nitric oxide to produce sulphuric acid which settles out onto the floor of the chamber. In the contact process a sulphur dioxide-air mixture, in the presence of a catalyst, further oxidizes into sulphur trioxide which reacts with water to form sulphuric acid. Since this reaction can proceed with explosive violence, sulphur trioxide normally is dissolved in concentrated sulphuric acid resulting in fuming sulphuric acid. Sulphuric acid of the desired concentration is made by adding an appropriate amount of water to the fuming sulphuric acid. Both processes require bulky towers, numerous processing steps, and are plagued with operating problems such as acid mists and the like.

A considerable improvement over the prior art can be made by conducting the oxidation and reaction steps in a wet environment. Such an arrangement affords a more compact manufacturing facility with attendant reductions in capital investment. Other improvements include shortened start-up and shut-down times for the manufacturing facility, improved safety, elimination of acid mists, elimination of undesirable affluents to the atmosphere, and the like.

It is an object of the present invention to teach methods of manufacturing sulphuric acid by wet oxidation of sulphur with further reaction into sulphuric acid in a wet environment within a closed circuit. It is an object of the present invention to capture the generated heat apart from the reactions for further useful work. Other objects, capabilities and advantages of the invention will become apparent as the description proceeds.

INTRODUCTION

A wet environment can be established within a reaction vessel by the introduction of a suitable inert liquid. Such a liquid should be inert in the sense that it will not react with sulphuric acid at any concentration, that it will not react with oxygen, and that it will not react with sulphur. Such a liquid should be a liquid at ambient temperature and should be capable of being contained in the liquid phase at temperatures up to the maximum planned temperature, for example 700° F. (371° C.), at pressures not exceeding the pressure required to keep water in the liquid phase at the same temperatures. Such a liquid should remain stable through repeated cycles of use. Such a liquid should be capable of absorbing large volumes, for example up to 50%, of oxygen. Such a liquid should have a specific gravity apart from that of sulphuric acid in all concentrations, from that of water, of oxygen and of sulphur. Such a liquid should be nonmissible with water.

Suitable inert liquids for use in the present invention include various fluorocarbons such as trifluorocarbon amines, cyclic fluorocarbon oxides, and perfluorocarbons. Among these families of fluorocarbons, those with eight or more carbon atoms are preferred because they are in the liquid phase at ambient temperature, for example 77° F. (25° C.). Those skilled in the art will be able to envision other liquids that meet the requirements of a suitable inert liquid as described heretofore. Such suitable inert liquids are hereinafter referred to as oxygen carrier liquids.

The sulphur for use in the present invention can be in any useful form such as elemental sulphur, sulphur dioxide, hydrogen sulphide, mineral sulphides and sulphites. These types of sulphur are sometimes called a source of sulphur. The preferred form of sulphur, however, is elemental sulphur reduced in particle size so that it will pass through a 200 mesh screen.

The water required for the present invention can be water from any convenient source. The water preferably would be treated to remove substantially all impurities so that unreacted residue would not accumulate within the various liquids involved in the processes. Further, it is preferred that the water be used as the carrier liquid for conveying the sulphur into the reactor as a slurry.

The reactor itself is a pressure vessel designed to withstand pressures up to the maximum pressure expected to be encountered in the process, for example up to 3,200 psia. As a practical matter the operating pressures planned can be a much lower value, for example 650 psia. The reactor is sized for the planned volume of throughput with due regard for necessary retention time needed for completion of the planned reactions. The reactor has suitable fittings permitting injection of a source of sulphur, of water, of oxygen carrier liquid, and of oxygen. The reactor has suitable fittings permitting the withdrawal of sulphuric acid and of stripped carrier liquid.

Wet oxidation processes generally proceed at a satisfactory rate in the temperature range of 250° F. (121° C.) to 750° F. (399° C.). At the lower end of the temperature range the reactions may not proceed at a rate sufficiently fast to be of particular commercial interest, therefore the preferred operating temperature is well up into the range, for example 480° F. (249° C.).

The oxygen carrier liquid normally will reach its maximum saturation point for oxygen near ambient temperature, for example 77° F. (25° C.). It is preferable that the oxygen carrier liquid be loaded with oxygen at a temperature near that of its maximum oxygen saturation temperature. While the oxygen carrier liquid may be brought up to the planned operating temperature, for example 480° F. (249° C.), before being injected into the reactor, it is preferred that the planned operating temperature be attained within the reactor itself. The necessary temperature rise from ambient to planned operating temperature can be accomplished with a suitable heat exchanger within the reactor, preferable located near the injection point for the oxygen carrier liquid.

The planned reactions involve oxidizing a source of sulphur to sulphur trioxide for further reaction with water into sulphuric acid. These reactions may be summarized as follows:

$$2S + 3O_2 + 2H_2O = 2H_2SO_4 + 10,908 \text{ BTU/LB. of S}$$

These exothermic reactions generate a considerable amount of surplus heat which may be captured apart from the reactor for further useful work. Preferably a heat exchanger is located in the upper portion of the reactor. Through this heat exchanger a suitable heat receptive fluid, for example water, is circulated with the heat removed from the reactor in useful form, for example steam.

In order to oxidize sulphur dioxide into sulphur trioxide at a rate of commercial interest it is preferred to use a catalyst. A number of catalysts may be used including platinum, vanadium, iron oxide and the like. The preferred catalyst is vanadium pentoxide carried in a porous substance such as silica, zeolites, kieselguhr, and the like. The catalyst mass may be reduced to small particle size and thus be suspended in the liquids. Preferably however, the catalyst mass is deployed in trays located within the reactor.

It is important that the source of sulphur be in intimate contact with oxygen and water in order to form the product sulphuric acid. It is therefore preferably that suitable mixing means be established in the reaction chamber so that the desired contact is assured. A preferred means of accomplishing this end is to inject the oxygen carrier liquid through a nozzle within the confines of a venturi tube, the venturi tube being the means of injecting the sulphur slurry into the reactor. Then with catalyst masses strategically located within the reactor, the planned reactions can be conducted at rates of commercial interest.

Upon completion of the desired reactions, the product sulfuric acid with a specific gravity of 1.834 will rise to the top portion of the reactor where it will float on the oxygen carrier liquid which has a higher specific gravity, for example 1.88. With continuous injection of the reactants, product sulphuric acid may be continuously withdrawn from the reactor. Likewise the oxygen carrier liquid, upon being stripped of its oxygen, may be continuously withdrawn from the reactor at a point below the product-carrier contact point or level.

The numerous advantages of the present invention have been summarized heretofore. As in most process improvements certain disadvantages are inherent. The principal disadvantage of the present invention is the requirement first to bring the oxygen carrier liquid up to planned operating temperature, then after the oxygen is consumed, to reduce the temperature of the oxygen carrier liquid to ambient temperature. Much of the heat required can be reused by heat exchange to the freshly injected reactants entering the reactor. The disadvantage can be further minimized by injection of additional oxygen into the oxygen carrier liquid, preferably immediately prior to introducing the oxygen carrier liquid into the reactor. In this manner the oxygen carrier liquid is supersaturated with oxygen, thus reducing the quantity of oxygen carrier liquid required for the oxygen carrier function.

BRIEF DESCRIPTION OF DRAWING

The FIGURE is a vertical section shown in diagrammatical form illustrating the arrangement of apparatus and the methods of the invention.

SUMMARY OF THE INVENTION

A pressure vessel, sometimes called a reactor or reaction chamber, is established with suitable fittings. Means are established for the injection into the reactor of a source of sulphur, water, oxygen carrier liquid and oxygen. Means are established for withdrawal from the reactor of product sulphuric acid and stripped oxygen carrier liquid; that is, oxygen carrier liquid from which the oxygen has been removed. Means are provided for positioning catalyst masses within the reactor. Means are established for heating the injected liquids. Means are established for the removal of surplus heat generated in the exothermic processes.

A source of sulphur, water, and a source of oxygen are injected into the reactor wherein the sulphur is oxidized into sulphur trioxide in the presence of water and a catalyst to form sulphuric acid. Withdrawals of sulfuric acid and stripped oxygen carrier liquid are balanced with injected fluids to maintain planned operating pressure. A portion of the generated heat of the reactions is used to preheat the injected fluids and a portion is captured apart from the reactor for further useful work.

DESCRIPTION OF THE PREFERRED EMBODIMENT

Referring to the drawing a reactor 10 of suitable dimensions, for example 21 inches inside diameter and a liquid height of 120 feet, is established. Within the reactor 10 are heat exchanger 14 which removes surplus heat, and heat exchanger 23 which is used to heat the injected fluids. Heat exchanger 14 contains inlet flow line 17 with valve 18 and outlet flow line 15 with valve 16. At the top of the reactor 10 is outlet flow line 11 with valve 12. The product sulphuric acid floats atop the oxygen carrier liquid forming a boundary between the two identified as 19 on the drawing and sometimes called the product-carrier contact. Below boundary 19 there is located an outlet flow line 20 containing valve 21. At various locations within reactor 10 are catalyst trays 22. Heat exchanger 23 contains inlet flow line 26 with valve 27 and outlet flow line 24 with valve 25. The sulphur slurry is injected into the reactor through flow line 28 containing valve 29 and through venturi 30. The oxygen carrier liquid is injected into the reactor through flow line 32 containing valve 33 and through nozzle 31. The oxygen carrier liquid is supersaturated with oxygen with the oxygen being injected through flow line 34 containing valve 35.

The process begins by opening 12 then opening valve 33 to permit filling the reactor with oxygen carrier liquid, with all other valves closed. Upon filling the reactor, valve 12 is closed and injection continues through flow line 32 until the reactor pressure near valve 12 reaches the planned pressure, for example 588 psia. Reactor 10 is suitably insulated (not shown) to minimize heat losses to the ambient environment.

With all valves closed and the contents of reactor 10 at ambient temperature, reactor start-up is begun by activating heat exchanger 23. Hot fluid, for example at a temperature of 500° F. (260° C.) is circulated through heat exchanger 24 in order to heat the oxygen carrier liquid in the lower portion of the reactor to a temperature near that of planned conditions, for example 480° F. (249° C.). Heat exchanger 23 may be of any convenient configuration but preferably of the type that has the capability of transfer of large quantities of heat to ascending liquids within reactor 10. The hot fluid injected initially into heat exchanger 23 may be from any convenient source, for example steam. After the reactions within reactor 10 become stabilized in operation, the heat required for heat exchanger 23 can be supplied, for example, by circulating withdrawn stripped carrier liquid from flow line 20 into flow line 26, or by circulating, for example, product sulphuric acid withdrawn from flow line 11.

With preheat initiated in heat exchanger 23, additional start-up steps are accomplished by opening valves 29, 33 and 21, with injection rates through flow-lines 28 and 32 operating in concert with the withdrawal rate through flow line 20 in order to maintain the desired pressure in reactor 10, for example in the range of 30 to 3200 psia but preferably 588 psia.

Within a relatively short period of time, for example approximately two minutes, reactor 10 will be up to planned operating conditions, for example an average temperature of 480° F. (249° C.) and a pressure of 588 psia. The planned reactions will be underway for wet oxidizing sulphur to sulphur trioxide in the presence of water to form sulphuric acid. With the planned reactions stabilized, valve 12 is opened to the extent necessary to withdraw sulphuric acid at a rate that will maintain the product-stripped carrier liquid at a convenient level for example, at a point 19 above flow line 20. Heat exchanger 14 is then activated to withdraw some of the exothermic heat by circulating a heat receptive fluid, for example water, into flow line 17 and withdrawing the heat through flow line 15 in fluid form, for example steam. This surplus heat is then captured apart for further useful work, for example generating electricity. A portion of the sensible heat in the product sulphuric acid may also be captured by heat exchange (not shown) for further useful work or for use in preheater 23.

In the preferred embodiment of the present invention it is not necessary to set the sulphur afire in order to obtain sulphur dioxide. For illustrative purposes only the processes of the present invention are described in terms of injecting 10,000 pounds of sulphur per hour into the reactor. For a material balance within the reactor 15,000 pounds of oxygen per hour will be required, together with 5,625 pounds of water per hour. Preferably the sulphur is reduced in particle size as a dry solid of elemental sulphur so that it will pass through a 200 mesh screen. The sulphur preferably is mixed with water to form a water-sulphur slurry of 64% solids. This slurry is then injected into the reactor via flow line 28 and preferably through venturi 30.

The oxygen carrier liquid preferably is $(C_8F_{17})_3N$. This oxygen carrier liquid has a capacity to dissolve oxygen at a temperature of 77° F. (25° C.) at a ratio of 3.72 pounds of oxygen for each 1000 pounds of oxygen carrier liquid. To provide the necessary oxygen into the reactor to react with the sulphur that is being injected as described heretofore, oxygen carrier liquid is injected at the rate of 33,600 pounds per minute carrying 250 pounds per minute of oxygen. Preferably the oxygen carrier liquid is saturated with oxygen at ambient temperature 77° F. (25° C.) in separate facilities (not shown). Upon entering flow line 32 the oxygen carrier liquid is supersaturated with oxygen by opening valve 35 and adding oxygen at a rate of, for example, 3.72 pounds of oxygen for each 1000 pounds of oxygen carrier liquid. The supersaturated oxygen carrier liquid is then intimately mixed with the injected sulphur slurry, preferably by injecting the supersaturated oxygen carrier liquid through nozzle 31.

In accordance with the foregoing description the retention time in the reactor is one minute. During that time 510 pounds of 66° Baume sulphuric acid is manufactured generating an exothermic heat of 1,818,000 BTU. The amount of exothermic heat available for outside work is dependent on the efficiency of insulation of the reactor, attendant flow lines and auxiliary storage vessels together with the efficiency of the various heat exchanges. The current state of the art in insulation and heat exchange will permit the capture of surplus heat for further useful work in the order of 1,000,000 BTU per minute. Such an amount of surplus heat will support an electric generating plant of 6,000 Kw capacity.

Thus it may be seen that sulphuric acid may be manufactured in compact facilities and within closed circuits by oxidizing sulphur in a liquid environment. Further the generated heat may be captured apart for other useful work. While the present invention has been described in a certain degree of particularity, it is understood that the present disclosure has been made by way of example and that changes in details of structure may be made without departing from the spirit thereof.

What is claimed is:

1. In a method for the production of sulphuric acid which comprises reacting elemental sulphur with oxygen dissolved in an inert liquid at temperatures between 250° F. and 750° F. and pressures between 30 psia and 3200 psia in the presence of water to form sulphuric acid, the improvement which comprises using as said inert liquid a compound selected from the group consisting of trifluorocarbon amines, cyclic fluorocarbon oxides and perfluorocarbons, each such compound having eight or more carbon atoms.

2. The method of claim 1 wherein a catalyst is deployed in said inert liquid, the said catalyst being selected from the group consisting of platinum, vanadium and iron oxide.

3. The method of claim 1 further including the step of capturing heat from the said inert liquid.

4. In a method for the production of sulphuric acid which comprises reacting a source of sulphur, said source of sulphur being selected from a group consisting of the sulphur dioxide and hydrogen sulphide, with oxygen dissolved in an inert liquid at superatmospheric temperatures and pressures in the presence of water to form sulphuric acid, the improvement which comprises using as said inert liquid a compound selected from the group consisting of trifluorocarbon amines, cyclic fluorocarbon oxides and prefluorocarbons, each such compound having eight or more carbon atoms.

5. The method of claim 4 wherein a catalyst is deployed in the said inert liquid, the said catalyst being selected from the group consisting of platinum, vanadium, and iron oxide.

6. The method of claim 4 further including the step of capturing heat from the said inert liquid.

* * * * *